Oct. 11, 1960     A. S. RIVENES     2,955,323
MOLDING APPARATUS
Filed Oct. 21, 1957     2 Sheets-Sheet 1
Fig. 1.
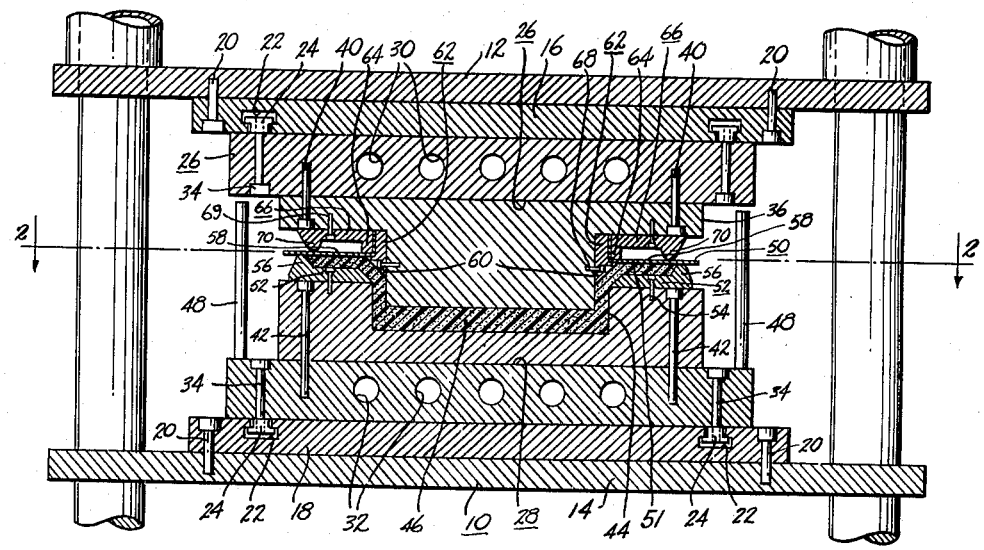
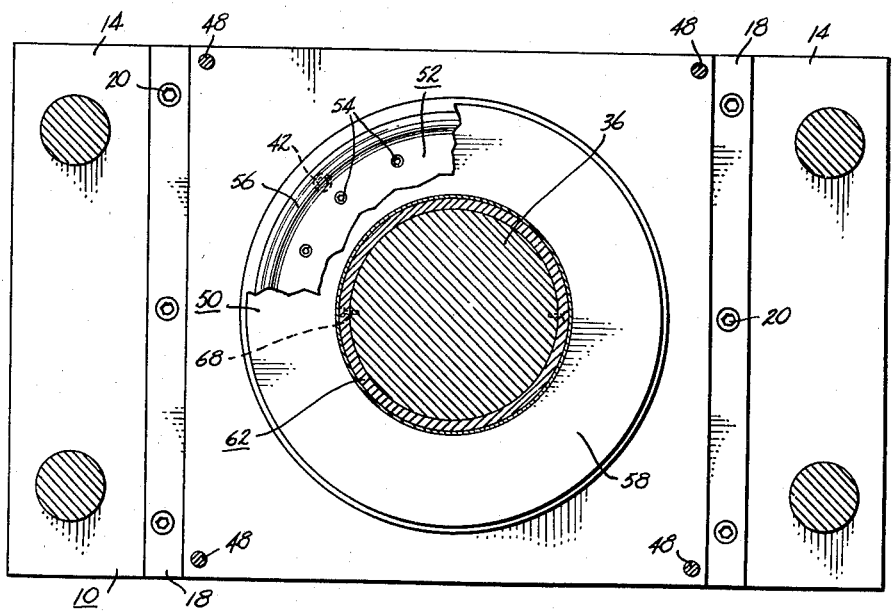
Fig. 2.
INVENTOR.
ARNOLD S. RIVENES
BY
ATTORNEY Oct. 11, 1960

A. S. RIVENES 2,955,323

MOLDING APPARATUS

Filed Oct. 21, 1957

2 Sheets-Sheet 2

INVENTOR.
ARNOLD S. RIVENES

BY K. H. Thomas

ATTORNEY

United States Patent Office 2,955,323
Patented Oct. 11, 1960

2,955,323

MOLDING APPARATUS

Arnold S. Rivenes, Seattle, Wash., assignor to Boeing Airplane Company, Seattle, Wash., a corporation of Delaware Filed Oct. 21, 1957, Ser. No. 691,378

3 Claims. (Cl. 18—42)

This invention relates to the art of molding and more particularly to the molding of materials which change their physical state during the molding operation.

When molding thermal-setting resins the resin is in a liquid state when first placed in the mold cavity. Then upon application of pressure and heat to the resin the resin changes its physical state to one of a solid. However, in undergoing this change from a liquid to a solid state undesirable voids occur in the resinous product unless certain precautions are taken. In particular, pressure must be maintained on the resinous material throughout the molding operation in order to obtain a void-free end product. Heretofore, various means have been provided to maintain this pressure on the material undergoing molding. One such prior art method is to provide auxiliary injection apparatus for the continuous maintenance of the pressure. However, such auxiliary apparatus is not versatile and is relatively costly.

Another prior art method of minimizing voids in the end product is to control the rate of closure of the mating dies and the viscosity of the material during the molding operation along with providing restrictive clearances between the mating portions of the dies. However, these many variables must be accurately controlled by the mold operator in order to produce a desirable end product.

An object of this invention is to provide novel and effective means for continuously maintaining sufficient pressure in a mold cavity to insure a void-free end product.

Another object of this invention is to provide means for compensating for shrinkage and loss of molding material within the mold cavity proper during the molding operation when the molding material changes its physical state from a liquid to a solid.

A more specific object of this invention is to so dispose and load a flexible diaphragm associated with the mold cavity that the diaphragm continuously maintains sufficient mechanical pressure to prevent the formation of voids in the molded material.

Figure 3:
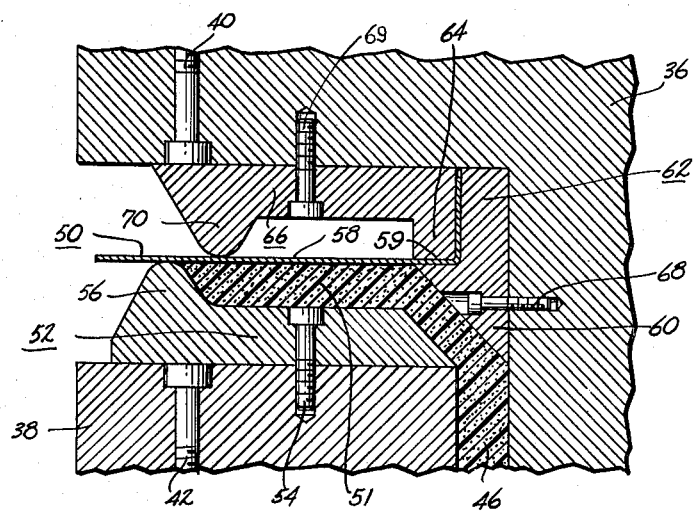
Figure 4:
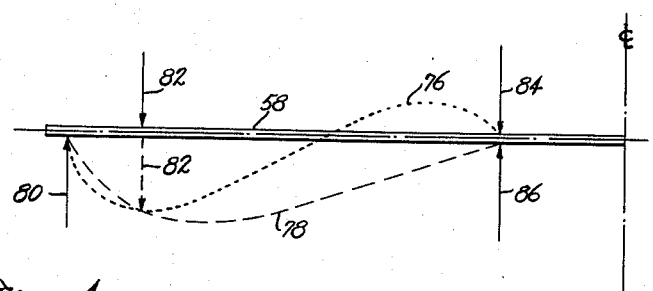

Other objects of this invention will become apparent from the following description when taken in conjunction with the accompanying drawings in which:

Fig. 1 is a vertical section view of a molding press embodying the teachings of this invention, Fig. 2 is a horizontal sectional view taken along the line 2—2 of Fig. 1, Fig. 3 is an enlarged view of the diaphragm and associated support and loading means as shown in Fig. 1, and Fig. 4 is a schematic diagram showing the flexed positions and loading of the diaphragm of Fig. 1.

Referring to Fig. 1 there is illustrated a molding press 10 embodying the teachings of this invention. The molding press 10 comprises a press head 12 and a press bed 14 which are disposed to be actuated toward one another by suitable hydraulic means (not shown). In order to facilitate the use of dies of various size caul plates 16 and 18 are suitably secured to the press head 12 and the press bed 14, respectively, by means of bolts 20. In particular, the caul plates 16 and 18 have a plurality of T-shaped slots 22 and a plurality of T-shaped slots (not shown) which transverse the slots 22. T-shaped runners 24 are disposed in the T-shaped slots 22, the T-shaped runners 24 each having a threaded opening therein.

For the purpose of providing heat during the molding operation retainers 26 and 28, having steam coils 30 and 32, respectively, are provided. As illustrated, the retainers 26 and 28 are suitably secured to the caul plates 16 and 18, respectively, by means of bolts 34 which extend into the threaded openings in the T-shaped runners 24. Thus, when the bolts 34 are tightened up the retainers 26 and 28 become rigidly secured to the caul plates 16 and 18, respectively.

Circular-shaped male and female mating dies or molds 36 and 38 are rigidly secured to the retainers 26 and 28, respectively, by means of bolts 40 and 42, respectively. Thus, the caul plate 16, the retainer 26, and the male die 36 are carried by the press head 12 and the caul plate 18, the retainer 28, and the female die 38 are carried by the press bed 14. The female die 38 is provided with a cavity 44 for receiving a molding material 46, which in this instance comprises fiberglass reinforcing material and a resin. In order to mold the molding material 46 to a given thickness stop members 48 are suitably secured to the retainer 28.

In accordance with the teachings of this invention a resin cut-off hydrostatic feedback device 50 is provided for continuously maintaining a mechanical pressure on the molding material 46 during the molding operation and for containing the material 46 within a reservoir 51 and the mold cavity 44 during the molding operation. Specifically, the device 50 comprises a ring-shaped support member 52 which is suitably secured to the female die 38 by means of bolts 54 and which has a vertically extending portion 56 of circular configuration in the horizontal plane which functions, in operation, to support a ring-shaped flexible metal diaphragm 58 adjacent its outer circumference or edge. As illustrated, the inner portion 59 of the diaphragm 58 is held rigidly adjacent its inner circumference or edge between a radially extending flange 60, of a collar 62, and a vertically extending flange 64, of a loading member 66, which likewise is of ring shape. The collar 62 and the loading member 66 are held in a fixed relationship with respect to one another and with respect to the male die 36 by means of bolts 68 and 69.

In this instance, the loading member 66 is provided with a vertically extending portion 70 of circular configuration in the horizontal plane which functions, in operation, to load the diaphragm 58 intermediate the adjacency of its inner and outer circumference as will be explained more fully hereinafter. As illustrated, the portion 56 of the support member 52 is disposed further outwardly in the radial direction than is the portion 70 of the loading member 66. The reason for this is to permit proper loading of the diaphragm 58.

The operation of the molding press 10 will now be described. Once the molding material 46 has been disposed in the mold cavity 44 the press bed 14 is actuated toward the press head 12 thus effecting an insertion of the male die 36 into the cavity 44. As the male die 36 is actuated further into the cavity 44 the molding material 46 is forced out into the reservoir 51 and finally flows over the portion 56 of the support member 52. Upon further movement of the female die 38 toward the male die 36 the diaphragm 58 engages the portion 56 of the support member 52 and thus effects a seal between the diaphragm 58 and the portion 56 to thereby prevent the further flow of the molding material 46 from the reservoir 51 to the area exterior of the dies 36 and 38. Further movement of the female die 38 toward the male die 36 flexes the diaphragm 58 until it assumes a position as represented by the curve 76 in Fig. 3. However, if the molding material 46 were not disposed in the mold cavity 44 then the diaphragm 58 would be flexed to a position as represented by the curve 78. Forces 80, 82, 84 and 86 represent the forces exerted on the diaphragm 58 by the portion 56, of the support member 52, the portion 70, of the loading member 66, the flange 64, of the loading member 66, and the flange 60, of the collar 62.

Once the female die 38 has been actuated toward the male die 36 to such an extent that the diaphragm 58 assumes the position represented by the curve 76, with the molding material 46 disposed in the cavity 44, then the stop members 48 prevent further movement of the female die 38 toward the male die 36. With the diaphragm 58 flexed as represented by the curve 76 the diaphragm 58 maintains a continuous mechanical pressure upon the molding material 46. When, during the molding operation, the molding material 46 shrinks, due to its change from the liquid to the solid state, the diaphragm 58 unflexes in a direction toward the curve 78 thus continuing to maintain the mechanical pressure on the molding material 46 to thereby minimize the formation of voids in the material formed from the molding material 46.

Although the dies 36 and 38, the diaphragm 58, the support member 52, and the loading member 66 have a circular configuration it is to be understood that this invention is equally applicable to dies for effecting molded products of other than circular shape.

The apparatus embodying the teachings of this invention has several advantages. For instance, the molding apparatus of this invention is not highly dependent upon the skill of the operator. In addition, the above mentioned desired results are accomplished with relatively simple and inexpensive apparatus. Further, the molding apparatus embodying the teachings of this invention is very effective in minimizing the number of voids that appear in the end product produced by the molding operation.

Since numerous changes may be made in the above apparatus, and different embodiments of the invention may be made without departing from the spirit and scope thereof, it is intended that all matter contained in the foregoing description and shown in the accompanying drawings shall be interpreted as illustrative and not in a limiting sense.

I claim as my invention:

1. Molding means comprising two mating dies disposed to be actuated toward each other, a flexible diaphragm having an inner portion and an outer circumference, said diaphragm being carried by one of said two mating dies at said inner portion, support means carried by the other of said two mating dies, said support means being disposed to engage said diaphragm at an area of said diaphragm that is adjacent the outer circumference of said diaphragm when said two mating dies are actuated toward each other, and load means also carried by said one of said two mating dies and disposed to engage said diaphragm intermediate said inner portion of said diaphragm and said area of engagement of said support means with said diaphragm, to thus effect a flexure of said diaphragm once said area of said diaphragm engages said support means and said two mating dies are actuated further toward each other.

2. Molding means for molding a material comprising a male die and a female die having a cavity for the reception of said material, said dies being disposed to be actuated toward each other, a flexible diaphragm having an inner portion and an outer circumference, said diaphragm being carried by the male die at said inner portion, support means carried by the female die, said support means being disposed to engage said diaphragm at an area of said diaphragm that is adjacent the outer circumference of said diaphragm when the male die and the female die are actuated toward each other, and loading means also carried by the male die and disposed to engage said diaphragm intermediate said inner portion of said diaphragm and said area of engagement of said support means with said diaphragm, to thus effect a flexure of said diaphragm once said area of said diaphragm engages said support means and the male die and the female die are actuated further toward each other, to thereby maintain a continuous pressure on said material during the molding operation.

3. Molding means for molding a material comprising a male die and a female die having a cavity for the reception of said material, said dies being disposed to be actuated toward each other, a flexible diaphragm having an inner portion and an outer circumference, said diaphragm being carried by the male die at said inner portion, support means carried by the female die, said support means being disposed to engage said diaphragm at an area of said diaphragm that is adjacent the outer circumference of said diaphragm when the male die and female die are actuated toward each other, loading means also carried by the male die and disposed to engage said diaphragm intermediate said inner portion of said diaphragm and said area of engagement of said support means with said diaphragm, to thus effect a flexure of said diaphragm once said area of said diaphragm engages said support means and the male die and the female die are actuated further toward each other, and support means disposed to prevent the further actuation of the male die and the female die toward each other once said diaphragm has been flexed a predetermined amount, to thereby maintain a continuous pressure on said material during the molding operation.

References Cited in the file of this patent

UNITED STATES PATENTS

| 2,433,084 | Beauchamp | Dec. 23, 1947 |
| 2,734,227 | Costick et al. | Feb. 14, 1956 |

FOREIGN PATENTS

| 113,517 | Australia | July 16, 1941 |
| 666,769 | Great Britain | Feb. 20, 1952 |